(12) United States Patent
Chen et al.

(10) Patent No.: US 6,826,064 B2
(45) Date of Patent: *Nov. 30, 2004

(54) STABLE VOLTAGE CONVERTER WITH MULTIPLE PULSE WIDTH MODULATED CHANNELS

(75) Inventors: An-Tung Chen, Hsinchu (TW); Yung-Peng Hwang, Hsinchu (TW)

(73) Assignee: Winbond Electronics Corporation, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 10/792,760

(22) Filed: Mar. 5, 2004

(65) Prior Publication Data

US 2004/0170035 A1 Sep. 2, 2004

Related U.S. Application Data

(63) Continuation-in-part of application No. 10/158,829, filed on Jun. 3, 2002, now abandoned.

(51) Int. Cl.[7] .............................. H02M 7/00; H03F 3/38

(52) U.S. Cl. .................. 363/65; 330/124 D; 330/124 R
(58) Field of Search .............................. 363/65, 71, 72, 363/79, 80, 81; 323/272, 285, 286, 288; 330/124 R, 10, 124 D, 11

(56) References Cited

U.S. PATENT DOCUMENTS

| | | | | |
|---|---|---|---|---|
| 5,552,643 A | * | 9/1996 | Morgan et al. | 307/81 |
| 5,834,925 A | * | 11/1998 | Chesavage | 323/272 |
| 6,278,263 B1 | * | 8/2001 | Walters et al. | 323/272 |
| 6,414,470 B1 | * | 7/2002 | Liu et al. | 323/272 |

* cited by examiner

Primary Examiner—Rajnikant B. Patel

(57) ABSTRACT

A stable voltage converter is described. The stable voltage converter has an error amplifier, a plurality of subtraction circuits, a plurality of converter channels, and a plurality of current sensors. The error amplifier compares a reference voltage and an average output voltage to generate an error signal for stabilizing the output voltage of the converter. The subtraction circuits input the error signal and channel current signals generated by the current sensors, and then output modified error signals for controlling the converter channels to adequately output direct current power outputs.

11 Claims, 3 Drawing Sheets

STABLE VOLTAGE CONVERTER WITH MULTIPLE PULSE WIDTH MODULATED CHANNELS

CROSS-REFERENCE TO RELATED APPLICATION

This application is a continuation-in-part of U.S. application Ser. No. 10/158,829 filed on Jun. 3, 2002 abandoned, hereby incorporated by reference as it fully set forth herein.

FIELD OF THE INVENTION

The present invention relates to a power converter and especially to a stable voltage converter with multiple pulse width modulated channels.

BACKGROUND OF THE INVENTION

Since the power consumption of the central processing unit (CPU) of computers is increasing, direct current (DC) converters need to supply more than 60 amps of current for computer operation. Consequently, a multi-channel structure converter provides a more economical performance than a single channel converter. Among the multi-channel converters, the multi-channel pulse width modulated (PWM) converter having a current ripple scattering effect may choose the smaller and cheaper filter capacitor. Therefore, most of the paralleled multi-channel converters employ the structure of the multiple PWM converter channels.

A multi-channel converter connects in parallel a plurality of pulse width modulated channels with the same output voltage for providing a higher output current. There is often a voltage difference between the channels supplying the same load. The difference between the channels may occur one or some channels providing a comparatively higher current. In particular, some types of converters, synchronous rectified converters, have the ability to sink as well as source output current. In these converters, a great current may flow from one channel to another. This phenomenon can lead to excessive power dissipation, at which point these channels bear the highest power load. Thereafter, the supplying ability of working components in every channel must be increased and the load that the converter supplies must be limited below the combined full load capability of the individual channel. Therefore, the converter cost may increase and the working life thereof may be reduced for only a few channels working in the high temperature. Hence, a converter with the capability to share and balance the load current may be the better choice. Every channel provides the same current, that is to say, every channel bears the same load and has almost the same working life. The working life and cost problems are solved by sharing and balancing the load current.

As shown in FIG. 1, there is one kind of converter called the passive droop converter. This converter utilizes a plurality of independent PWM channels coupled with a plurality of resists respectively located on the output sides of the channels. The output current of every channel is reduced as the output current increases, whereupon every channel shares the output current equally. The passive droop converter with a simple control circuit increases additional power consumption and the total output voltage is reduced as the total output current increases. As the drawing depicts, error amplifier (E/A) 201a, 201b, 201c compares the $V_{REF}$ and the voltage of position 205a, 205b, 205c and then outputs control signal to the pulse width modulator 202a, 202b, 202c. The pulse width modulator 202a, 202b, 202c controls the duty cycle of the power switch 203a, 203b, 203c to output pulse power output. The inductor 204a, 204b, 204c and the capacitor 208 filter the pulse power output to form a direct current output. The direct current output reduces the output voltage be proportional to the direct current output by the devoltage resister 206a, 206b, 206c, and then outputs to the load 207. The output voltage is more reduced if the output current is more increased, whereupon every channel shares the output current equally. The converter may balance every channel's output current but problems of additional power consumption and total output voltage reducing as the total output current increases still exist.

Another kind of converter is shown in the FIG. 2. The converter, called an active droop converter, is an improvement on the passive droop converter of FIG. 1. The converter senses the channel current signals of the converter channels and then adjusts a modified reference signal according to the deviation between the channel current signal and the reference voltage, $V_{REF}$. Every channel may reduce the channel power output proportional to the channel current output, and therefore every channel may share the total output current equally. The active droop converter improves upon the passive droop converter to reduce the power consumption problem but the total output voltage still is reduced as the total output current increases. As the drawing depicts, the active droop converter with multiple converter channels utilizes the current sensors 306a, 306b, 306c to sense channel current signals of the channels and the subtraction circuits 301a, 301b, 301c compare the $V_{REF}$ and the channel current signals to output modified reference signals to the E/As 302a, 302b, 302c. The E/As 302a, 302b, 302c compare the modified reference signals and the voltage output of the channel to form signals, $V_{E/A}$. The pulse width modulators 303a, 303b, 303c adjust the duty cycle of the power switches 304a, 304b, 304c based on the signals $V_{E/A}$ and a ramp input. Finally, the inductor 305a, 305b, 305c and the capacitor 309 filter the pulse power output to form the direct current output to the load 308.

According to the above description, the multi-channel PWM converter in parallel reduces the total output voltage as the total output current increasing because of the reference signals be reduced. Therefore, a method for simplifying the control circuits of the converter with a stable total output voltage is needed in the paralleled multi-channel PWM converter.

SUMMARY OF THE INVENTION

The present invention provides a stable voltage and balanced current converter with multiple pulse width modulated channels.

The stable voltage converter includes an error amplifier, a plurality of subtraction circuits, a plurality of converter channels, and a plurality of current sensors. The error amplifier has a reference voltage input and an average output voltage input. Therefore, the error amplifier compares the reference voltage and the average output voltage to generate an error signal. Each of the subtraction circuits is coupled with the error amplifier and one of the converter channels. The subtraction circuits get the error signal and channel current signals from the current sensors, and then generate modified error signals to control the converter channel. Each of converter channels includes a pulse width modulator, a power switch, and a filter. The pulse width modulator, having a ramp input and the modified error signal input, forms a pulse width modulator signal output. The ramp input is coupled with a ramp voltage source. The power switch couples with the pulse width modulator, inputs the pulse width modulator signal and then outputs a pulse power output. The filter having an inductor and a capacitor couples with the power switch and filters the pulse power to generate the direct current power output. The current sensor detects the direct current power output of the channel and generates the channel current signal to the subtraction circuit. Therefore, each of the plurality of converter channels may automatically reduces the direct current power output thereof through a proportion of the direct current power output, and then the converter channels may balanced output current equally. The total output voltage may adjust according to the comparison result of the reference voltage and the total output voltage. Hence, the converter according to the invention may be a stable voltage and balanced current converter with multiple pulse width modulated channels.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The invention discloses a stable voltage converter with multiple pulse width modulated channels. The converter supplies a higher output current and simplifies and equally shares the current to every channel with a stable voltage output in different amounts of current output.

Figure 1:
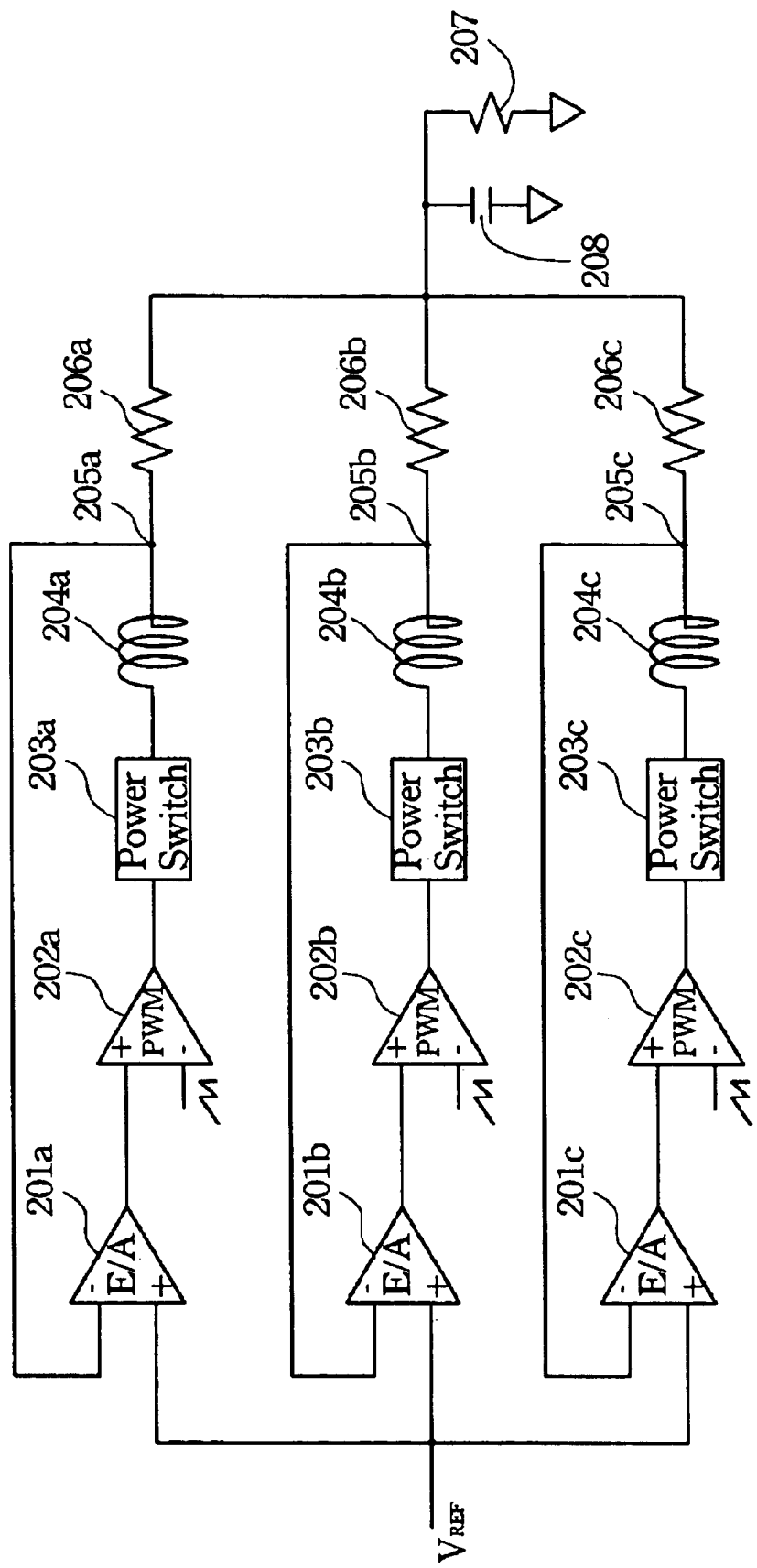
FIG. 1 is a circuit diagram of a passive droop converter with three PWM channels.
Figure 2:
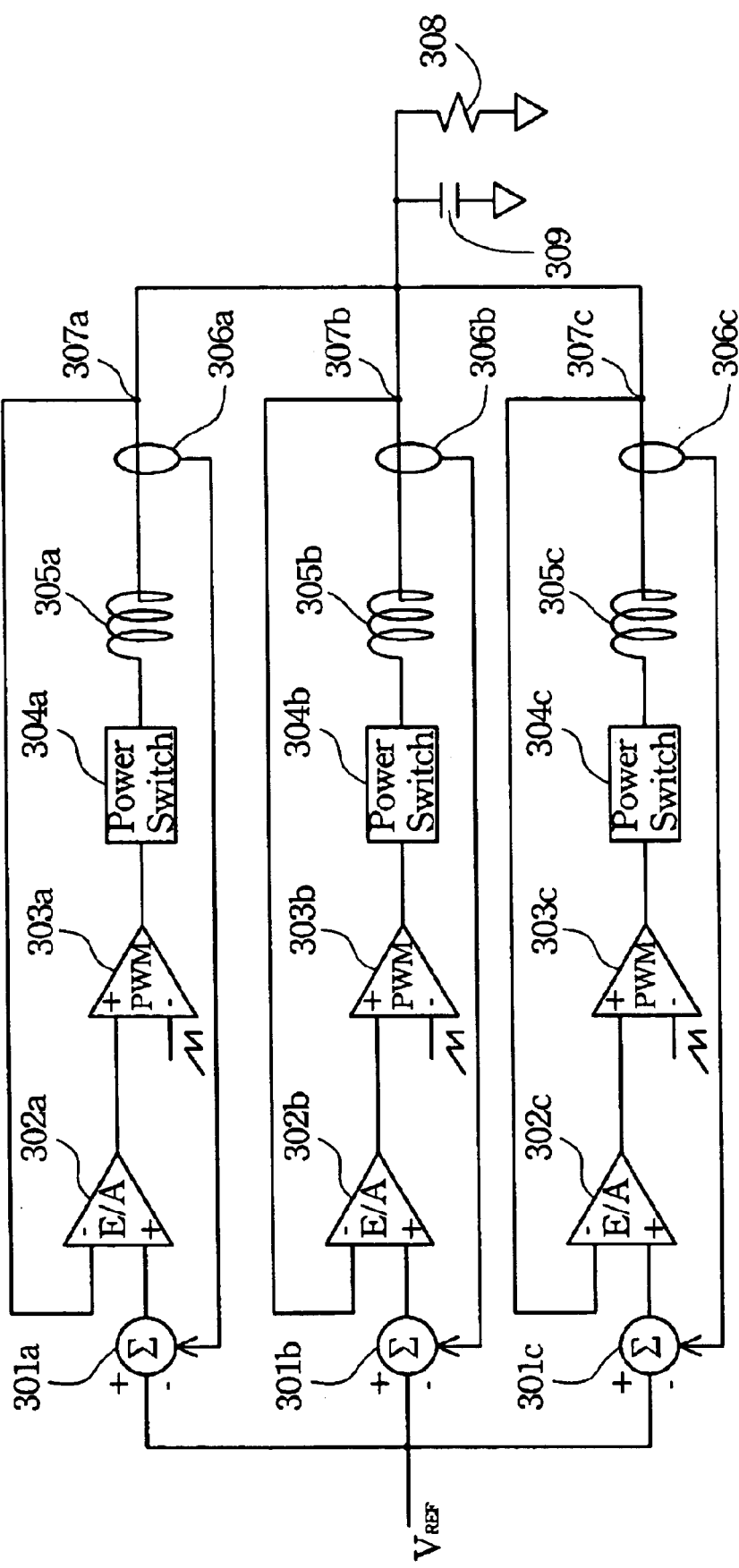
FIG. 2 is a circuit diagram of an active droop converter with three PWM channels.
Figure 3:
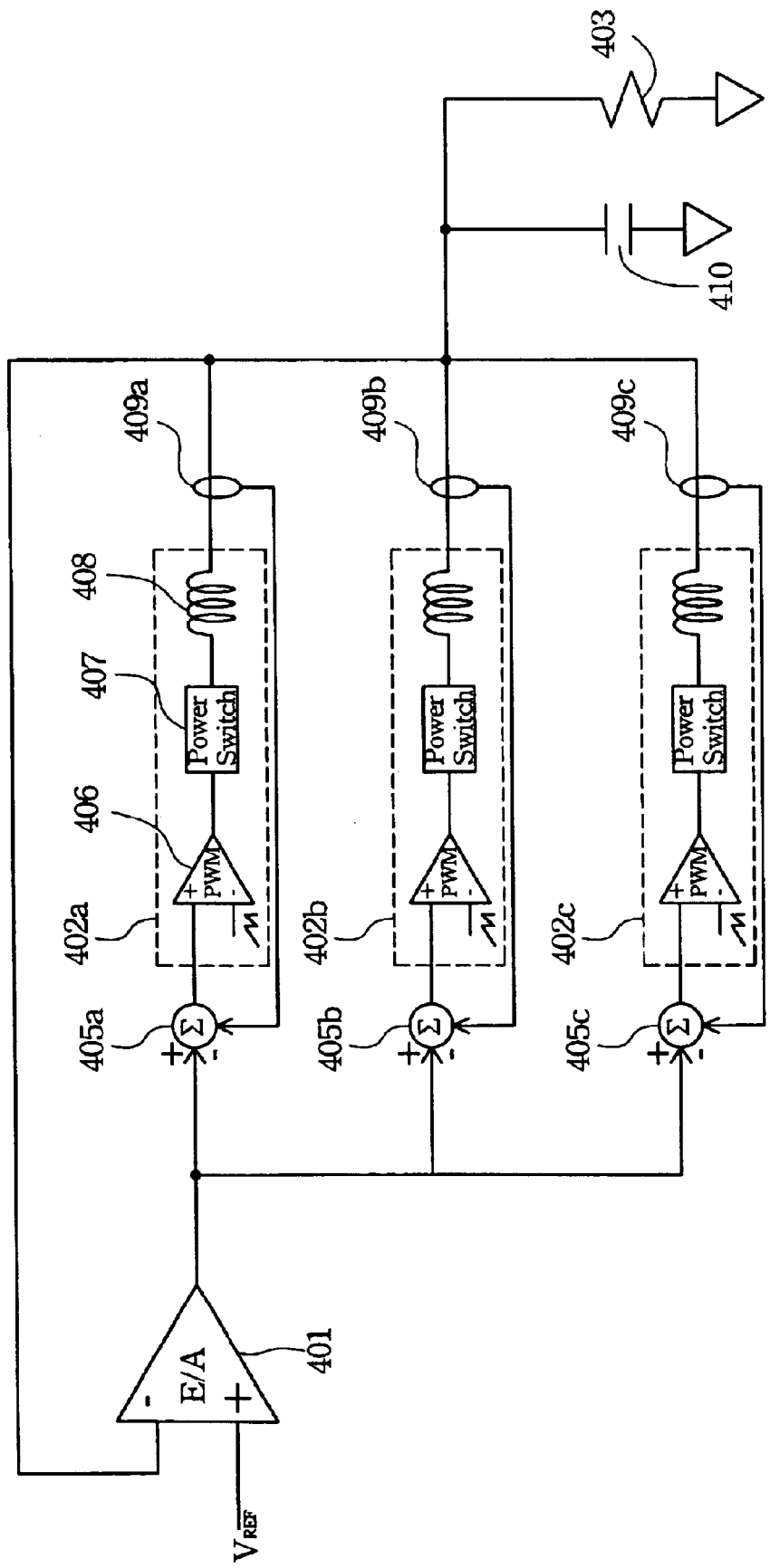
FIG. 3 is a circuit diagram of a converter with three PWM channels according to the invention.

FIG. 3 is a circuit diagram of a converter with three PWM channels according to the invention. As the drawing depicts, the E/A 401 compares the $V_{REF}$ and the output voltage of the converter and then outputs an error signal, $V_{E/A}$. The $V_{REF}$ is a reference voltage of the converter and is proportional to the requirement of output voltage of the converter. The error signal $V_{E/A}$ increases while the output voltage of the converter is lower than the $V_{REF}$. Conversely, the error signal $V_{E/A}$ decreases while the output voltage of the converter is higher than the $V_{REF}$.

The $V_{E/A}$ is an input of subtraction circuits 405a, 405b, 405c for controlling each pulse width modulated channels 402a, 402b, 402c to increase or decrease the duty cycle thereof. Hence, the converter may adjust the output voltage getting higher as $V_{REF}$ is higher than the output voltage and the converter may adjust the output voltage getting lower as $V_{REF}$ is lower than the output voltage. The other inputs of the subtraction circuits 405a, 405b, 405c are channel current signals from current sensors 409a, 409b, 409c. The subtraction circuits 405a, 405b, 405c compare the $V_{E/A}$ and the channel current signal from the current sensors 409a, 409b, 409c and then generate respective modified error signals for each pulse width modulated channels 402a, 402b, 402c. Finally, the converter combines all the power outputs of the PWM channels 402a, 402b and 402c together and supplies them to the load 403.

As the PWM channel 402a illustrates, each converter channel according to the invention includes a pulse width modulator 406, a power switch 407 and an inductor 408. The error signal generated by the subtraction circuit 405a is one input of the pulse width modulators 406. The other input of the pulse width modulators 406 is a ramp signal from a ramp voltage source. The pulse width modulators 406 compares the two input signal and adjusts the duty cycle thereof to control the duty cycle of the power switch 407. Thereafter, the power switch 407 supplies a pulse power output and the filter circuit, the inductor 408 and the capacitor 410, filters the pulse power output to a DC power output. A preferred current sensor 409a is a precision resistor or a turn-on resistor of the power switch 407, a MOSFET switch, and then a differential amplifier measures the voltage drop of the two ends of the resistor. The voltage drop is proportional to the output current of the PWM channel 402a. One of ordinary skill in the art will realize various other implementations and applications with which such an inventive stable voltage converter may be employed.

The stable voltage converter with multiple pulse width modulated channels according to the invention utilizes a negative feedback loop to adjust the total output voltage to generate a stable output voltage in the converter with multiple pulse width modulated channels. The invention is an improvement upon the problem that the total output voltage is reduced as the total output current increases. Further, the invention may turn on or turn off the converter channel dependent on the output current need because the invention utilizes a plurality of independent PWM converter channels without any correlative signal base on the channel quantity. Furthermore, the same circuit design of the present invention can simply applied to various converters with more PWM converter channels or less. That is to say, the invention may simply applied to various quantities of PWM converter channels and no circuit needs to be changed.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A stable voltage converter with multiple pulse width modulated channels, the converter comprising:

a converter output having an average output voltage signal of the converter;

an error amplifier inputting a reference voltage signal and the average output voltage signal, wherein said error amplifier compares the reference voltage signal and the average output voltage signal to generate an error signal;

a plurality of subtraction circuits in parallel coupled with the error amplifier, wherein each of the subtraction circuits receives the error signal and a channel current signal, and generates a modified error signal;

a plurality of converter channels, each of the converter channels coupled with one of the subtraction circuits, wherein each of the plurality of converter channels inputs the modified error signal and generates a direct current power output; and a plurality of current sensors, each of the current sensors coupled with one of the converter channel, wherein each of the current sensors measures the direct current power output and feeds back the channel current signal to the subtraction circuit coupled with the same converter channel.

2. The converter according to claim 1, wherein each of said plurality of converter channels further comprises:
- a pulse width modulator coupled with said subtraction circuit, said pulse width modulator inputting a ramp signal, said modified error signal and generating a pulse width modulator signal;
- a power switch coupled with said pulse width modulator, said power switch inputting the pulse width modulator signal and outputting a pulse power based on the pulse width modulator signal; and
- a filter having an inductor and a capacitor, said filter coupled with said power switch and filtering said pulse power to generate the direct current power output.

3. The converter according to claim 1, wherein the reference voltage signal is proportional to an output voltage requirement of the converter.

4. The converter according to claim 1, wherein the current sensor utilizes a precision resistor to measure a voltage drop between two ends of the resistor and generates the channel current signal.

5. The converter according to claim 1, wherein the current sensor utilizes a turn-on resistor of the power switch to measure a voltage drop between two ends of the turn-on resistor and generates the channel current signal.

6. The converter according to claim 1, wherein each of said plurality of converter channels has a turn-off capacity and said converter may equally share a total direct current power output to the other converter channels without turn-off.

7. A stable voltage converter with multiple pulse width modulated channels, the converter comprising:
- a converter output having an average output voltage signal of the converter;
- an error amplifier inputting a reference voltage signal and the average output voltage signal, wherein said error amplifier compares the reference voltage signal and the average output voltage signal to generate an error signal;
- a plurality of subtraction circuits in parallel coupled with the error amplifier, wherein each of the subtraction circuits receives the error signal and a channel current signal, and generates a modified error signal;
- a plurality of converter channels, each of the converter channels coupled with one of the subtraction circuits, wherein each of the plurality of converter channels comprises:
  - a pulse width modulator inputting a ramp signal, said modified error signal and generating a pulse width modulator signal;
  - a power switch coupled with said pulse width modulator, said power switch inputting the pulse width modulator signal and generating a pulse power output based on the pulse width modulator signal; and
  - a filter coupled with said power switch and filtering said pulse power to generate the direct current power output; and
- a plurality of current sensors, each of the current sensors coupled with one of the converter channels, wherein each of the current sensors measures the direct current power output and feeds back the channel current signal to the subtraction circuit coupled with the same converter channel.

8. The converter according to claim 7, wherein the reference voltage signal is proportional to an output voltage requirement of the converter.

9. The converter according to claim 7, wherein the current sensor utilizes a precision resistor to measure a voltage drop between two ends of the resistor and generates the channel current signal.

10. The converter according to claim 7, wherein the current sensor utilizes a turn-on resistor of the power switch to measure a voltage drop between two ends of the turn-on resistor and generates the channel current signal.

11. The converter according to claim 7, wherein each of said plurality of converter channels has turn-off capacity and said converter may equally share a total direct current power output to the other converter channels without turn-off.

* * * * *